US009731947B2

(12) United States Patent
Yamamoto et al.

(10) Patent No.: US 9,731,947 B2
(45) Date of Patent: Aug. 15, 2017

(54) WHEEL DRIVE APPARATUS AND FORKLIFT

(71) Applicant: Sumitomo Heavy Industries, Ltd., Tokyo (JP)

(72) Inventors: Taizo Yamamoto, Kanagawa (JP); Koji Moritani, Kanagawa (JP); Masayuki Ishizuka, Kanagawa (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 0 days.

(21) Appl. No.: 14/457,687

(22) Filed: Aug. 12, 2014

(65) Prior Publication Data

US 2015/0091366 A1 Apr. 2, 2015

(30) Foreign Application Priority Data

Sep. 27, 2013 (JP) ................................ 2013-201795

(51) Int. Cl.
*B60K 1/00* (2006.01)
*B66F 9/075* (2006.01)

(52) U.S. Cl.
CPC ...... *B66F 9/07572* (2013.01); *B66F 9/07509* (2013.01); *B66F 9/07595* (2013.01)

(58) Field of Classification Search
CPC .......... B60K 7/0007; B60K 2007/0038; B60K 2007/0092
USPC ....................................................... 180/65.51
See application file for complete search history.

(56) References Cited

U.S. PATENT DOCUMENTS 2,726,726 A * 12/1955 Le Tourneau ............. 180/65.51
3,161,249 A * 12/1964 Zuppiger et al. ............... 180/10
3,370,668 A * 2/1968 Goodacre ..................... 180/253
3,812,928 A * 5/1974 Rockwell et al. ......... 180/65.51
4,071,121 A * 1/1978 Daniel ...................... 188/196 P
4,415,067 A 11/1983 Cory
4,483,422 A 11/1984 Cory
(Continued)

FOREIGN PATENT DOCUMENTS

DE 10219922 A1 11/2003
JP S55-103060 A 8/1980
(Continued)

OTHER PUBLICATIONS

Office Action issued in Japanese Application No. 2013-201795, dated Apr. 18, 2017.

*Primary Examiner* — J. Allen Shriver, II
*Assistant Examiner* — Travis Coolman
(74) *Attorney, Agent, or Firm* — Michael Best & Friedrich LLP

(57) ABSTRACT

Wheel drive apparatuses are provided on left and right wheels of a forklift and drive the respective wheels. Each of the wheel drive apparatuses includes a brake on the inside of a vehicle body of the forklift. The brake includes a brake shaft, friction plates, and a brake cover. The brake cover is removable from the wheel drive apparatus while the wheel drive apparatuses are mounted on the vehicle body. The friction plates are assembled with the brake shaft so as to be movable in an axial direction, and are removable from the wheel drive apparatus, while the wheel drive apparatuses are mounted on the vehicle body, by sliding along the brake shaft toward the inside of the vehicle body in the axial direction when the brake cover has been removed.

15 Claims, 3 Drawing Sheets

(56) References Cited

U.S. PATENT DOCUMENTS

| | | | | |
|---|---|---|---|---|
| 4,938,321 | A * | 7/1990 | Kelley et al. | 188/171 |
| 5,014,800 | A * | 5/1991 | Kawamoto et al. | 180/65.51 |
| 5,236,055 | A * | 8/1993 | Legal | 180/65.51 |
| 5,508,924 | A * | 4/1996 | Yamashita | 701/22 |
| 5,796,192 | A * | 8/1998 | Riepl | 310/67 R |
| 5,920,136 | A * | 7/1999 | Schmid | 310/77 |
| 6,057,617 | A * | 5/2000 | Schmid | 310/77 |
| 6,732,827 | B2 * | 5/2004 | San Miguel | 180/242 |
| 7,100,722 | B2 * | 9/2006 | Bowen | 180/65.51 |
| 7,159,677 | B1 * | 1/2007 | Lam et al. | 180/65.51 |
| 7,262,579 | B1 * | 8/2007 | Shepard | 318/810 |
| 8,191,342 | B2 * | 6/2012 | Ishii et al. | 56/11.9 |
| 8,371,423 | B2 * | 2/2013 | Hehl, Sr. | 188/267 |
| 8,384,263 | B2 | 2/2013 | Hiramatsu et al. | |
| 8,887,848 | B2 * | 11/2014 | Ishizuka et al. | 180/68.1 |
| 9,252,641 | B2 | 2/2016 | Ishizuka | |
| 2004/0214680 | A1 * | 10/2004 | Schoon | 475/149 |
| 2006/0113853 | A1 * | 6/2006 | Stubner | 310/83 |
| 2009/0267441 | A1 | 10/2009 | Hiramatsu et al. | |
| 2010/0206649 | A1 * | 8/2010 | Ishii | 180/65.31 |
| 2012/0161498 | A1 * | 6/2012 | Hansen | 301/6.5 |
| 2012/0222906 | A1 | 9/2012 | Yamamoto | |
| 2013/0221777 | A1 | 8/2013 | Isizuka | |

FOREIGN PATENT DOCUMENTS

| | | | |
|---|---|---|---|
| JP | S57-199447 | A | 12/1982 |
| JP | 2003-180044 | A | 6/2003 |
| JP | 2004-064819 | A | 2/2004 |
| JP | 2004-364470 | A | 12/2004 |
| JP | 2008-271714 | A | 11/2008 |
| JP | 2009-195008 | A | 8/2009 |
| JP | 2012-182917 | A | 9/2012 |
| JP | 2013-059174 | A | 3/2013 |
| JP | 2013-170697 | A | 9/2013 |

* cited by examiner (COMPARATIVE EXAMPLE)

WHEEL DRIVE APPARATUS AND FORKLIFT

INCORPORATION BY REFERENCE

Priority is claimed to Japanese Patent Application No. 2013-201795, filed Sep. 27, 2013, the entire content of which is incorporated herein by reference.

BACKGROUND

Technical Field

The present invention relates to a wheel drive apparatus and a forklift including the wheel drive apparatus.

Description of the Related Art

In the related art, a wheel drive apparatus that drives a wheel of a work vehicle such as a forklift and includes a reduction gear, a motor, and a brake mechanism integrally mounted on the wheel is known.

SUMMARY

According to an aspect of the invention, there is provided a forklift including wheel drive apparatuses that are provided on left and right wheels and are configured to drive the respective wheels. Each of the wheel drive apparatuses includes a brake on the inside of a vehicle body of the forklift, and the brake includes a brake shaft, friction plates, and a brake cover. The brake cover is removable from the wheel drive apparatus while the wheel drive apparatus is mounted on the vehicle body. The friction plates are assembled with the brake shaft so as to be movable in an axial direction, and are removable from the wheel drive apparatus, while the wheel drive apparatus is mounted on the vehicle body, by sliding along the brake shaft toward the inside of the vehicle body in the axial direction when the brake cover has been removed.

DETAILED DESCRIPTION

In the wheel drive apparatus for the forklift, it is demanded to secure the maintainability of the wheel drive apparatus or to increase the degree of freedom in the disposition of other devices on the lower surface of the vehicle body.

It is desirable to provide a technique that secures the maintainability of a wheel drive apparatus driving a wheel of a forklift or increases the degree of freedom in the disposition of other devices.

According to the aspect, the wheel drive apparatuses having lengths in the axial direction, which are set so that an appropriate space is secured between rear ends of the wheel drive apparatuses disposed on the inside of the vehicle body so as to face each other, are formed in the forklift in which the wheel drive apparatus is provided on each of the wheels.

Accordingly, it is possible to check or replace the brake cover or the friction plate while the wheel drive apparatuses are mounted on the vehicle body.

According to another aspect of the invention, there is provided a wheel drive apparatus configured to drive a wheel of a forklift. The wheel drive apparatus includes a motor, the motor includes a coil that is wound by distribution winding, and coil ends of the coil are compressed in an axial direction.

According to this aspect, it is possible to make the length of the motor in the axial direction shorter than that of the wheel drive apparatus in the related art. Accordingly, when the wheel drive apparatuses are mounted on the vehicle body of the forklift, the degree of freedom in the disposition of other devices on the lower surface of the vehicle body of the forklift is improved or the maintainability of the wheel drive apparatus is improved.

Meanwhile, the arbitrary combination of the above-mentioned components, and the components or expression of the invention that is substituted with any one of a method, an apparatus, a system, and the like are also effective as aspects of the invention.

According to the aspect of the invention, it is possible to secure the maintainability of the wheel drive apparatus that drives a wheel of the forklift or to increase the degree of freedom in the disposition of other devices.

Figure 1:
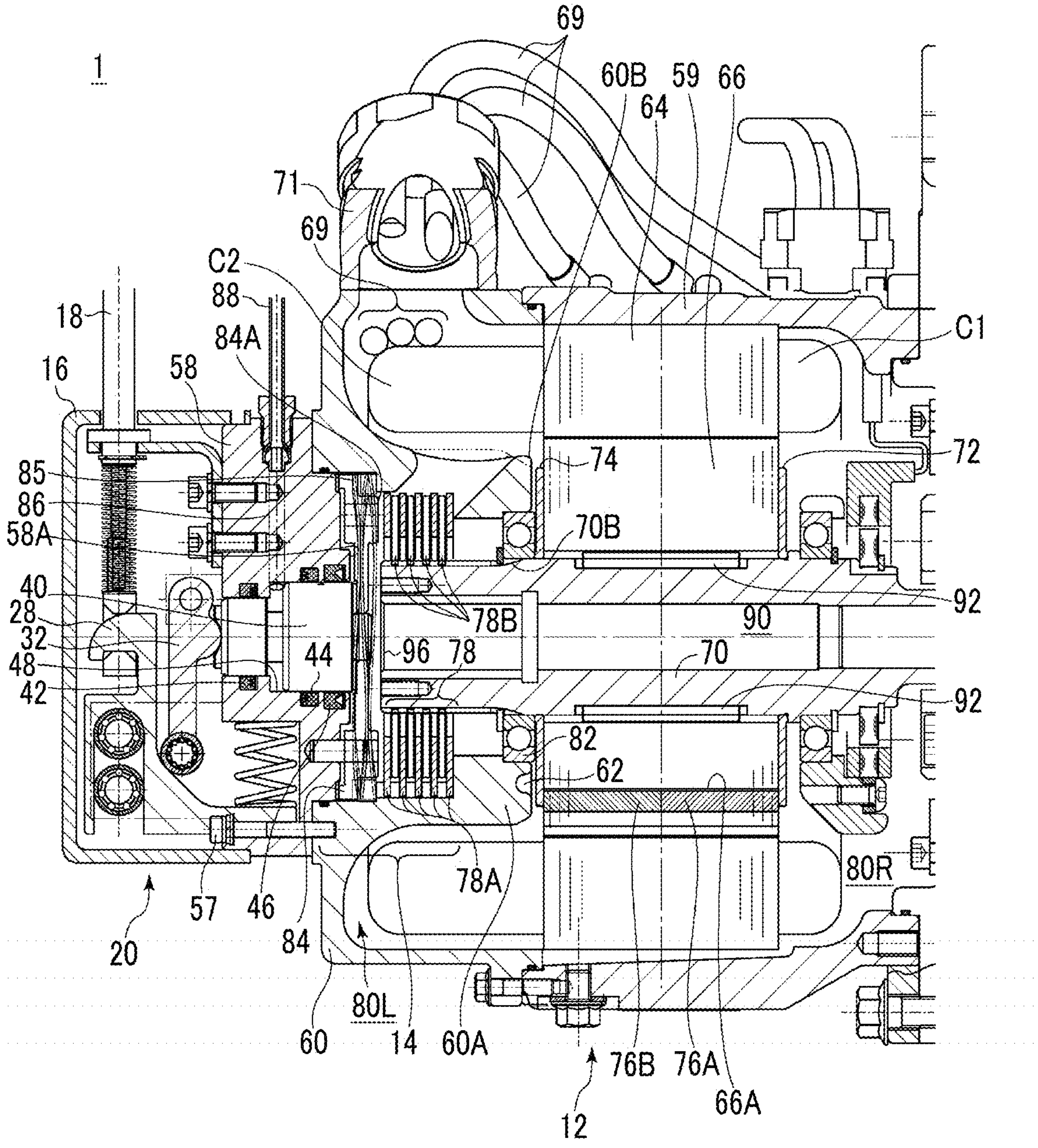
FIG. 1 is a cross-sectional view of a wheel drive apparatus of a forklift according to a comparative example taken along a vertical plane including a central axis.
Figure 2:
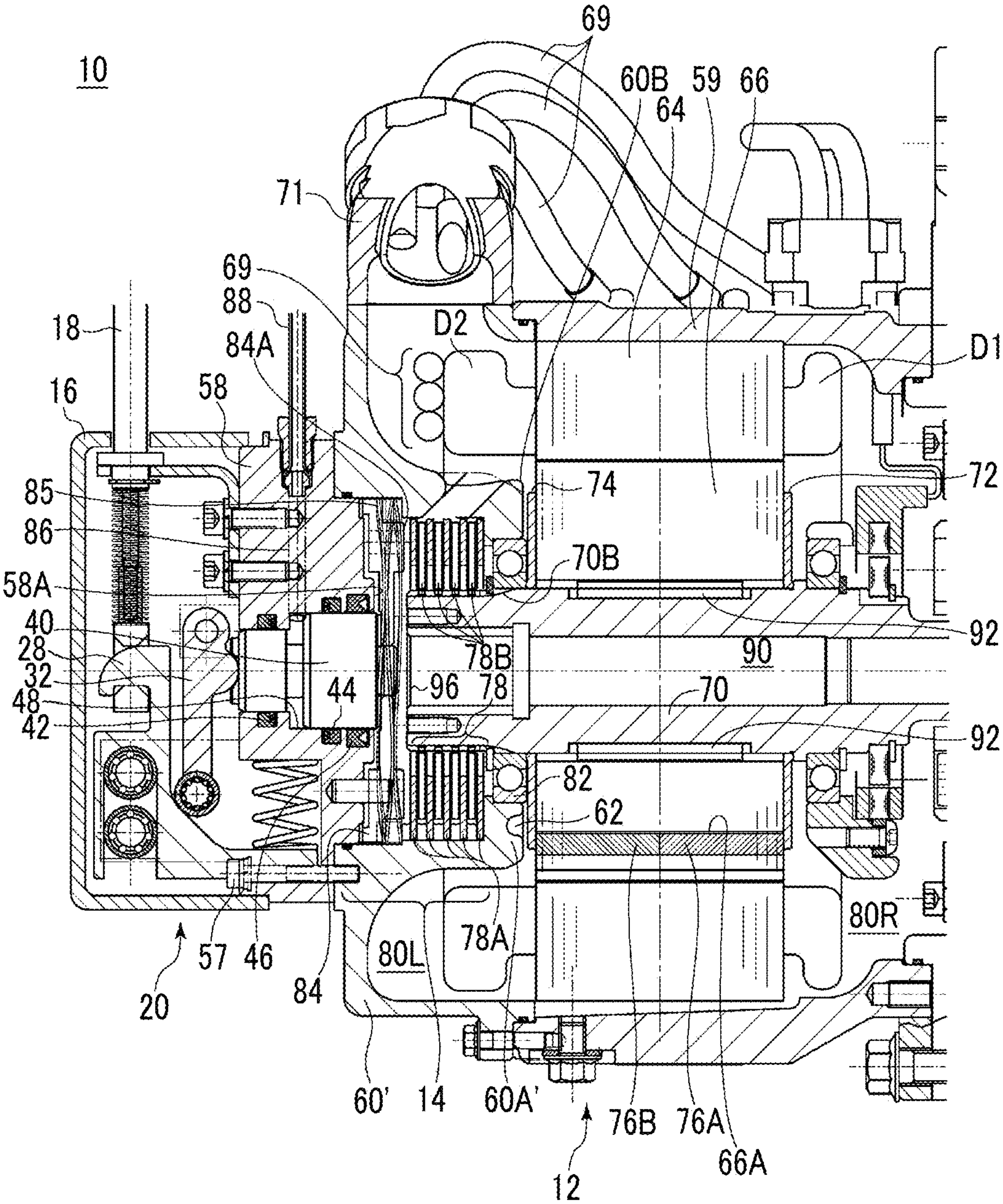
FIG. 2 is a cross-sectional view of a wheel drive apparatus of a forklift according to an embodiment of the invention taken along a vertical plane including a central axis.

FIG. 1 is a cross-sectional view of a part of a wheel drive apparatus 1 according to a comparative example taken along a vertical plane including a central axis of the wheel drive apparatus 1, and FIG. 2 is a cross-sectional view of a part of a wheel drive apparatus 10 according to an embodiment of the invention taken along a vertical plane including a central axis of the wheel drive apparatus 10. As long as not particularly disallowed, the following description is applicable to both the wheel drive apparatuses 1 and 10.

Each of the wheel drive apparatuses 1 and 10 is an apparatus in which a reduction gear (not shown), a motor 12, a wet multi-disc brake mechanism 14, and a parking brake device 20 are integrated, and is used to drive wheels of a work vehicle including a forklift.

Each of the wheel drive apparatuses 1 and 10 may be provided on each of left and right wheels of a forklift, and left and right wheels may be driven by one wheel drive apparatus through a differential gear that is provided between the wheel drive apparatus and the wheels. The former structure will be described below with reference to FIG. 3.

The motor 12 is an interior permanent magnet (IPM) synchronous electric motor including a stator 64 and a rotor 66, each of which is formed of laminated steel sheets. A plurality of cavities 66A extending in an axial direction are formed in the laminated steel sheets of the rotor 66, and permanent magnets 76A and 76B are embedded into the cavities. The efficiency of an IPM motor in which permanent magnets are embedded into a rotor is higher than that of a surface permanent magnet (SPM) motor in which permanent magnets are attached to the surface of a rotor. The laminated steel sheets, which form the rotor 66, are integrated with each other by caulking, and are integrated with a rotor shaft 70 by keys 92. Meanwhile, the laminated steel sheets may be integrated not by caulking but bolts or adhesion. A rear portion (a left portion in FIG. 1) of the rotor shaft 70 is rotatably supported by an extension portion 60A, which extends inward from a rear casing 60 (60' in FIG. 2), with a bearing 82 interposed therebetween.

A front end portion (a right portion in FIG. 1) of the rotor shaft 70 is connected to an input shaft of a reduction gear having an arbitrary structure, or is directly connected to a load such as a wheel.

The stator 64 is fixed to a front casing 59. Insulating paper is inserted into each of a plurality of slots of the stator 64, and coils for generating a magnetic field are wound over the slots a predetermined number of times. Folded portions of the coils for winding are coil ends C1 and C2 in the wheel drive apparatus 1 according to the comparative example of FIG. 1, and are coil ends D1 and D2 in the wheel drive apparatus 10 according to the embodiment of FIG. 2. The folded portions protrude from both ends of the stator 64 in an axial direction.

Although not shown, skew, which is to improve a voltage waveform or reduce cogging torque and is formed of openings of the slots, is formed on an inner peripheral surface of the stator 64 facing the rotor 66. Meanwhile, the skew may be formed on an outer peripheral surface of the rotor 66 facing the stator 64 without being formed on the stator 64, and the skew may be formed on both the inner peripheral surface of the stator 64 and the outer peripheral surface of the rotor 66. In the latter case, the twist direction of the skew of the stator is the same as the twist direction of the skew of the rotor.

Endplates 72 and 74, which prevent the permanent magnets 76A and 76B embedded into the rotor from flying out during the rotation of the rotor, are mounted on both end faces of the rotor 66 in the axial direction. The endplate is made of, for example, stainless steel or aluminum. Meanwhile, the material of the end plate may be a non-magnetic material without being limited to aluminum, and may be, for example, a resin.

A hollow portion 90, which extends in the axial direction, is formed in the rotor shaft 70. An anti-load-side (left) end portion of the hollow portion 90 communicates with a space 80L, which is formed in the casings 59 and 60 (60' in FIG. 2), at an opening 96, and, for example, an input shaft of a reduction gear (not shown) is inserted into a load-side (right) end portion of the hollow portion 90.

The brake mechanism 14 is disposed at a rear portion of the motor 12 so as to be coaxial with the motor, and brakes the rotation of the rotor shaft 70 of the motor. The brake mechanism 14 is housed inside the coil end C2 or D2 of the coil, which is wound on the stator 64, in a radial direction, and includes a multi-disc brake unit 78 including a plurality of friction plates. The friction plates of the multi-disc brake unit 78 are formed of a plurality of (five in the examples in FIG. 1) stationary friction plates 78A and a plurality of (four in the example in FIG. 1) rotating friction plates 78B.

The stationary friction plates 78A are fixed between a second brake piston 84, which is disposed so as to close the rear end of the rear casing 60 (60' in FIG. 2), and the extension portion 60A of the rear casing 60, in a circumferential direction by through pins (not shown), and are movable along the through pins in the axial direction.

Meanwhile, the rotating friction plates 78B are assembled with the rotor shaft (which is also a brake shaft) 70 that rotates integrally with the rotor 66, and can rotate integrally with the rotor shaft 70. A spline 70B is formed in the axial direction on the outer periphery of the rotor shaft 70, and inner peripheral ends of the rotating friction plates 78B are engaged with the spline 70B. Accordingly, the rotating friction plates 78B are integrated with the rotor shaft 70 in the circumferential direction through the spline 70B, and are movable in the axial direction of the rotor shaft 70. Friction sheets adhere to the surfaces of the rotating friction plates 78B.

A first brake piston 40 is disposed so as to slide in a cylinder 48 that is formed in a brake cover 58 mounted on a rear end of the rear casing 60 (60' in FIG. 2). Since the cylinder 48 communicates with a hydraulic mechanism through an oil passage 86 and a brake hose 88, pressure oil is supplied into the cylinder 48 from the hydraulic mechanism according to a braking operation. A portion between the first brake piston 40 and the cylinder 48 is sealed from a space 80L, which is formed in the motor, and the parking brake device 20 by three seals 42, 44, and 46.

The second brake piston 84 is disposed between a right end face 58A of the brake cover 58 and the multi-disc brake unit 78 so as to be moved while coming into contact with and interlocking with the right end face of the first brake piston during the movement of the first brake piston 40. A contact surface 84A, which comes into contact with the stationary friction plate 78A positioned at the leftmost end according to a braking operation, is formed at the right end of the second brake piston 84.

A return spring 85, which biases the second brake piston 84 to the left, is provided between the second brake piston 84 and a shoulder portion that is formed on the inner periphery of the rear casing 60.

The motor 12 and the brake mechanism 14 are formed to have a wet type structure. Inner spaces of the motor 12 and the brake mechanism 14 form a series of closed spaces, and a coolant is sealed in the spaces and can be circulated in the spaces. The coolant not only cools the rotor 66 and the stator 64 of the motor 12 but also functions as a lubricant for the bearing and a sliding part of the motor at the same time. In this embodiment, the amount of the coolant sealed in the casings 59 and 60 is set so that a part of the bearing 82 of the motor 12 is submerged in the coolant when the central axis is horizontal.

Meanwhile, the coolant is not limited to a lubricant, and may be a coolant that is used only for cooling. Further, if a part of the motor and the brake mechanism are submerged, the coolant may be circulated between an outer container or a pipe and the spaces by a pump or the like instead of being sealed in the spaces.

Next, a braking action of the brake mechanism 14 will be described.

Pressure oil is supplied into the cylinder 48 from the hydraulic mechanism through the oil passage 86 on the basis of predetermined braking control, so that the first brake piston 40 is moved to the load side (the right side in FIG. 1) in the cylinder 48. Accordingly, the second brake piston 84 is also moved to the right side and the contact surface 84A presses the stationary friction plate 78A, which is positioned at the leftmost end, in the axial direction. As a result, the plurality of stationary friction plates 78A come into contact with the plurality of rotating friction plates 78B one after another with a large force. As described above, the stationary friction plates 78A are fixed in a circumferential direction by the through pins and the rotating friction plates 78B are integrated with the rotor shaft 70 in the circumferential direction through the spline 70B that is assembled with the rotor shaft 70. For this reason, the stationary friction plates 78A and the rotating friction plates 78B come into strong contact with each other with the friction sheets, which adhere to the rotating friction plates 78B, interposed therebetween, so that an action for braking the rotor shaft 70 occurs.

Since the supply of pressure oil into the cylinder 48 is stopped when the braking control is ended, the second brake piston 84 and the first brake piston 40 return to the anti-load side (the left in FIG. 1) due to a restoring force of the return spring 85, which is provided between the second brake piston 84 and the shoulder portion of the rear casing 60, and the respective stationary friction plates 78A return to the original positions in the axial direction. Accordingly, the rotating friction plates 78B also return to the original positions in the axial direction and the contact between the stationary friction plates 78A and the rotating friction plates 78B is released, so that the braking action is stopped.

The parking brake device 20 is mounted on the rear end of the brake cover 58. The parking brake device 20 is adapted to generate a braking force during the parking of the vehicle by using the multi-disc brake unit 78 of the brake mechanism 14. The parking brake device 20 is covered with a cap 16, and a brake wire 18 is guided into the cap through a hole formed at the cap 16.

When a driver operates a parking brake lever (not shown), a first member 28 and a second member 32 of the parking brake device 20 are operated by the brake wire 18 and the rear end portion of the first brake piston 40 is moved to the right side in FIG. 1. As a result, as during the braking operation of the above-mentioned brake mechanism 14, the plurality of stationary friction plates 78A come into contact with the plurality of rotating friction plates 78B one after another with a large force and an action for braking the rotor shaft (brake shaft) 70 occurs.

When the wheel drive apparatus is mounted on a work vehicle such as a forklift, the wheel drive apparatus is usually disposed on the side of the wheel facing the inside of the vehicle body. It is preferable that the length of the wheel drive apparatus in the axial direction be shortened to ensure the maintainability of the wheel drive apparatus and to increase the degree of freedom in the disposition of other devices on the lower surface of the vehicle body. It is effective to shorten the length of the motor to shorten the length of the wheel drive apparatus.

In the wheel drive apparatus 1 according to the comparative example shown in FIG. 1, the coils are distributed and wound on the stator 64. In general, this distributed winding motor is more excellent than a concentrated winding motor in terms of magnetic characteristics, but the coil end of the coil of the distributed winding motor is lengthened. Accordingly, there is a problem in that the distributed winding motor is not suitable in the reduction of the length of the motor. Actually, as known from FIG. 1, the coil ends C1 and C2 of the coil wound on the stator 64 occupy a large volume in the front and rear casings 59 and 60.

Further, in the wheel drive apparatus 10 according to this embodiment, as shown in FIG. 2 as the coil ends D1 and D2, the coil ends are formed to be compressed in the axial direction and to slightly protrude outward in the radial direction so that a defect of the distributed winding motor, that is, the long length of the coil ends is improved.

More specifically, for example, a jig, which has a concave cross-section and has an inner diameter larger than the coil end, compresses the coil ends by being pressed against each of the coil ends on both sides of the stator. For example, on the load side (the right side in FIG. 1), the length of the coil end C1, which is not yet compressed, in the axial direction is 30 mm and the length of the compressed coil end D1 in the axial direction is reduced to 20 mm. Further, on the anti-load side (the left side in FIG. 1), the length of the coil end C2, which is not yet compressed, in the axial direction is 55 mm and the length of the compressed coil end D2 in the axial direction is reduced to 38 mm.

As a result of the reduction of the length of the coil end, it is possible to employ the rear casing 60' of which the length in the axial direction is shorter than the length of the rear casing 60 of the comparative example in the axial direction. Accordingly, it is possible to reduce the length of the motor 12 in the axial direction. In addition to or instead of the employment of the rear casing 60', a front casing of which the length in the axial direction is shorter than the length of the front casing 59 of the comparative example in the axial direction may be employed.

When the coil ends are compressed as described above, there is also a concern that the coating of the coil may be damaged. However, since a motor of a wheel drive apparatus for a forklift is usually driven by a relative low voltage (for example, AC voltage in the range of 30 to 50 V), the damage to the coating of the coil hardly affects the performance of the motor.

When three power lines 69 of the coils, which are connected to the three-phase AC power supply, are led from the anti-load side (the brake side, the inside of the vehicle body) through a plug 71 that is mounted on the rear casing, it is possible to reduce the length of the apparatus in the axial direction and to easily handle power lines as compared to a case in which power lines are led from the load side. Further, the brake mechanism is also smoothly disposed.

Furthermore, the lengths of the rotor and the stator of the distributed winding motor are short in comparison with a concentrated winding motor having the same output. For this reason, when the distributed winding motor is employed, an agitation loss caused by the coolant present in a gap between the rotor and the stator is small as compared to the concentrated winding motor. Accordingly, the efficiency of the motor is improved. In addition, the costs of the materials of the rotor core and the stator core are also reduced.

A procedure for removing the brake cover while the wheel drive apparatus shown in FIG. 2 is mounted on the vehicle body of the forklift will be described with reference to FIGS. 3A to 3C.

Figures 3A, 3B, 3C:
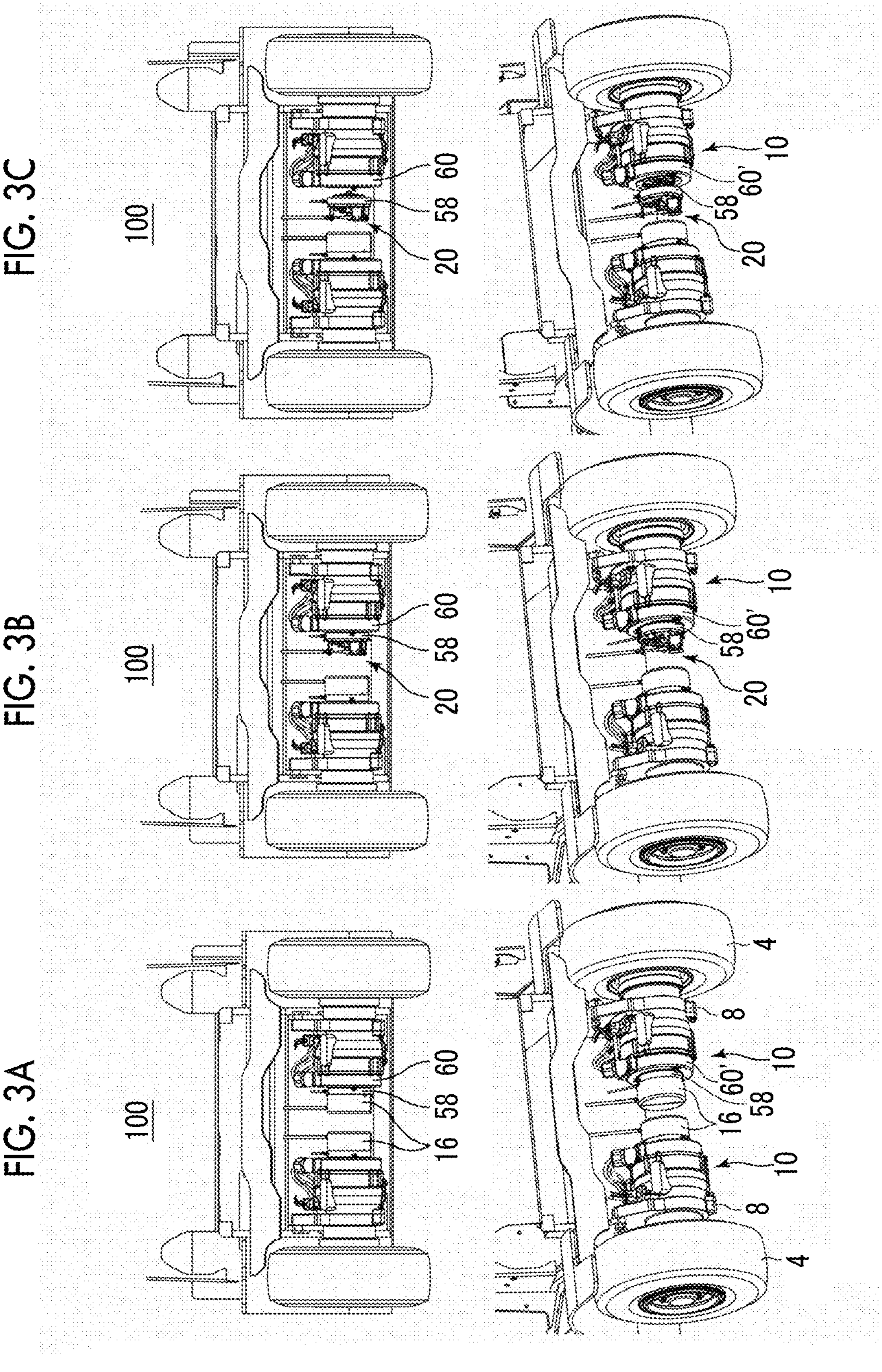
FIGS. 3A to 3C are views showing that a brake cover is removed when the wheel drive apparatus of FIG. 2 is mounted on a vehicle body of the forklift.

Upper stages of FIGS. 3A to 3C are front plan views of a forklift in which the wheel drive apparatus 10 is provided on each of the left and right wheels 4 of the forklift 100 (of which only a part is shown), and lower stages thereof are front perspective views.

The casing of the wheel drive apparatus 10 is fixed to a vehicle body-side structure of the forklift 100 through a flange 8. As described above, the parking brake device 20 is mounted on the side of the wheel drive apparatus 10 facing the inside of the vehicle body. Since the parking brake device 20 is covered with the cap 16, the parking brake device 20 is not seen in FIG. 3A.

Since the length of the wheel drive apparatus 10 according to this embodiment in the axial direction is shorter than the length of the wheel drive apparatus according to the comparative example in the axial direction, a space, which is sufficient for the insertion of a worker's hand or a tool, is secured between both the caps 16 while the left and right wheel drive apparatuses are mounted on the vehicle body (see FIG. 3A).

For this reason, as shown in FIG. 3B, it is possible to remove the cap 16 from the wheel drive apparatus while the wheel drive apparatus 10 is mounted on the vehicle body. In addition, as shown in FIG. 3C, it is possible to remove the brake cover 58, on which the parking brake device 20 is mounted, from the wheel drive apparatus by separating bolts 57 (see FIG. 2) while the wheel drive apparatus 10 is mounted on the vehicle body.

As described above, the stationary friction plates 78A of the brake mechanism 14 are movable along the through pins (not shown) in the axial direction and the rotating friction plates 78B are movable in the axial direction of the rotor shaft (brake shaft) 70. Accordingly, it is possible to remove the stationary friction plates 78A and the rotating friction plates 78B from the wheel drive apparatus, while the wheel drive apparatus is mounted on the vehicle body, by sliding the stationary friction plates 78A and the rotating friction plates 78B along the rotor shaft (brake shaft) 70 toward the inside of the vehicle body in the axial direction after removing the brake cover 58 and removing the second brake piston 84 and the return spring 85.

Meanwhile, there is also a case in which the wheel drive apparatus does not need to be adapted so that the brake cover 58, the stationary friction plates 78A, and the rotating friction plates 78B are removed while the wheel drive apparatus is mounted on the vehicle body. Even though these components cannot be removed, the wheel drive apparatus may be adapted so that the brake can be checked (for example, a check rod can be inserted) while the wheel drive apparatus is mounted on the vehicle body by making the length of the wheel drive apparatus in the axial direction short.

Since the components of the brake mechanism can be checked (for example, the wear of the components can be measured) and the components can be replaced while the wheel drive apparatus is mounted on the vehicle body as described above, the maintainability of the brake mechanism is improved.

According to this embodiment, it is possible to make the length of the motor, eventually, the wheel drive apparatus in the axial direction shorter than that of the comparative example by compressing the coil ends of the coils, which are wound by distribution winding, in the axial direction as described above.

When the wheel drive apparatus is provided on each of the left and right wheels of the forklift, it is possible to secure a space that is formed between the rear ends of the wheel drive apparatuses and is larger than that of the comparative example. Accordingly, the maintainability of the brake mechanism, which is disposed at the rear portion of the wheel drive apparatus, is improved.

Since a trunnion disposition portion needs to be formed at the casing of the wheel drive apparatus when a trunnion structure is employed in a mast that raises the fork of the forklift, there is a problem in that the length of the apparatus in the axial direction is longer than the length of the other structure in the axial direction. However, according to the wheel drive apparatus of this embodiment, it is possible to absorb an increase of the length of the wheel drive apparatus in the axial direction, which is caused by the trunnion structure, by reducing the length of the motor in the axial direction.

The embodiments of the invention have been described above. These embodiments are illustrative, and it is understood to those skilled in the art that the combination of the respective components of these embodiments may have various modifications and the modifications are also included in the scope of the invention.

The forklift having a structure in which the wheel drive apparatus is provided on each of the left and right wheels has been described in the embodiment. However, certain embodiments of the invention can also be applied to a forklift having a structure in which left and right wheels are driven by one wheel drive apparatus through a differential gear provided between the wheel drive apparatus and the wheels.

The wheel drive apparatus in which the brake mechanism is disposed coaxially with the motor has been described in the embodiment. However, certain embodiments of the invention also can be applied to a wheel drive apparatus having a structure in which a brake mechanism is disposed parallel to a motor. In this case, the degree of freedom in the disposition of other devices on the lower surface of the vehicle body of the forklift is improved or maintainability is improved by the reduction of the length of the wheel drive apparatus in the axial direction.

A structure in which inner spaces of the motor and the brake mechanism of the wheel drive apparatus form a series of spaces and a coolant is sealed in the spaces has been described in the embodiment. However, certain embodiments of the invention also can be applied to a wheel drive apparatus having a structure in which a coolant is sealed in only an inner space of the motor. Moreover, certain embodiments of the invention can also be applied to a wheel drive apparatus including a dry type motor or a dry type brake mechanism in which a coolant is not sealed. Further, the type of the motor is not limited to the IPM synchronous electric motor, and certain embodiments of the invention can be applied even in the case of an SPM synchronous electric motor or an induction motor.

A structure in which the rotor shaft of the motor 12 and the brake shaft of the brake mechanism 14 are integrated with each other has been described in the embodiment, but the rotor shaft and the brake shaft may be formed separately from each other.

It should be understood that the invention is not limited to the above-described embodiment, but may be modified into various forms on the basis of the spirit of the invention. Additionally, the modifications are included in the scope of the invention.

What is claimed is:

1. A forklift comprising:
- a first wheel drive apparatus that is provided on a left wheel and is configured to drive the left wheel; and
- a second wheel drive apparatus that is provided on a right wheel and is configured to drive the right wheel,
- wherein each of the first and second wheel drive apparatuses includes a motor and a brake disposed at a rear portion of the motor,
- the brake includes a brake shaft, friction plates assembled with the brake shaft so as to be movable in an axial direction, and a brake cover provided on a rear side of the friction plates,
- a first space necessary for a removal operation of the brake cover and the friction plates is secured between a rear end of the first wheel drive apparatus and a rear end of the second wheel drive apparatus,
- the brake cover is removable from the first and second wheel drive apparatuses, respectively, while the first and second wheel drive apparatuses are mounted on a vehicle body,
- the friction plates are removable from the first and second wheel drive apparatuses, while the first and second wheel drive apparatuses are mounted on the vehicle body, by sliding along the brake shaft toward the inside of the vehicle body in the axial direction when the brake cover has been removed,
- the brake cover and the friction plates do not overlap when seen in a radial direction, each of the first and second wheel drive apparatuses include a parking brake device provided on a rear portion of the brake and a cap that covers the parking brake device, the parking brake device and the cap are removable from the first and second wheel drive apparatuses, while the first and second wheel drive apparatuses are mounted on the vehicle body, a second space necessary for a removal operation of the cap, the parking brake device, the brake cover and the friction plates is secured between a rear end surface of the cap of the first wheel drive apparatus and a rear end surface of the cap of the second wheel drive apparatus, and the parking brake device is mounted on the brake cover and is removable from the first and second wheel drive apparatuses, respectively, while the parking brake device is mounted on the brake cover.

2. The forklift according to claim 1, wherein the motor includes a coil that is wound by distribution winding, and coil ends of the coil are compressed in the axial direction.

3. The forklift according to claim 2, wherein a lead part of a power line of the motor is provided on the brake side, and the lead part and the friction plates overlap when seen in a radial direction.

4. The forklift according to claim 1, wherein a coolant is sealed in the motor.

5. The forklift according to claim 1, wherein coil ends of a coil of the motor and the friction plates overlap when seen in a radial direction.

6. The forklift according to claim 1, wherein coil ends of a coil of the motor and the brake cover do not overlap when seen in a radial direction.

7. The forklift according to claim 1, wherein the parking brake device is configured to generate a braking force by using the friction plates of the brake.

8. A forklift comprising:

a first wheel drive apparatus that is provided on a left wheel and is configured to drive the left wheel; and a second wheel drive apparatus that is provided on a right wheel and is configured to drive the right wheel, wherein each of the first and second wheel drive apparatuses includes a motor and a brake disposed at a rear portion of the motor, the brake includes a brake shaft, friction plates assembled with the brake shaft so as to be movable in an axial direction, and a brake cover provided on a rear side of the friction plates, a first space necessary for a removal operation of the brake cover and the friction plates is secured between a rear end of the first wheel drive apparatus and a rear end of the second wheel drive apparatus, the brake cover is removable from the first and second wheel drive apparatuses, respectively, while the first and second wheel drive apparatuses are mounted on a vehicle body, the friction plates are removable from the first and second wheel drive apparatuses, while the first and second wheel drive apparatuses are mounted on the vehicle body, by sliding along the brake shaft toward the inside of the vehicle body in the axial direction when the brake cover has been removed, the brake cover and the friction plates do not overlap when seen in a radial direction, each of the first and second wheel drive apparatuses include a parking brake device provided on a rear portion of the brake and a cap that covers the parking brake device, the parking brake device and the cap are removable from the first and second wheel drive apparatuses, while the first and second wheel drive apparatuses are mounted on the vehicle body, a second space necessary for a removal operation of the cap, the parking brake device, the brake cover and the friction plates is secured between a rear end surface of the cap of the first wheel drive apparatus and a rear end surface of the cap of the second wheel drive apparatus, the parking brake device is configured to generate a braking force by using the friction plates of the brake, the brake includes a brake piston that presses the friction plates and is configured to move the brake piston by a pressure oil supplied from a hydraulic mechanism, and the parking brake device includes a brake wire and an operation member operated via the brake wire and is configured to move the brake piston by the operation member.

9. The forklift according to claim 8, wherein the motor includes a coil that is wound by distribution winding, and coil ends of the coil are compressed in the axial direction.

10. The forklift according to claim 9, wherein a lead part of a power line of the motor is provided on the brake side, and the lead part and the friction plates overlap when seen in a radial direction.

11. The forklift according to claim 8, wherein the brake cover includes a cylinder in which the brake piston is disposed and an oil passage for supplying the pressure oil into the cylinder.

12. The forklift according to claim 8, wherein a coolant is sealed in the motor.

13. The forklift according to claim 8, wherein coil ends of a coil of the motor and the friction plates overlap when seen in a radial direction.

14. The forklift according to claim 8, wherein coil ends of a coil of the motor and the brake cover do not overlap when seen in a radial direction.

15. The forklift according to claim 8, wherein the parking brake device is configured to generate a braking force by using the friction plates of the brake.

* * * * *